Figure 1:
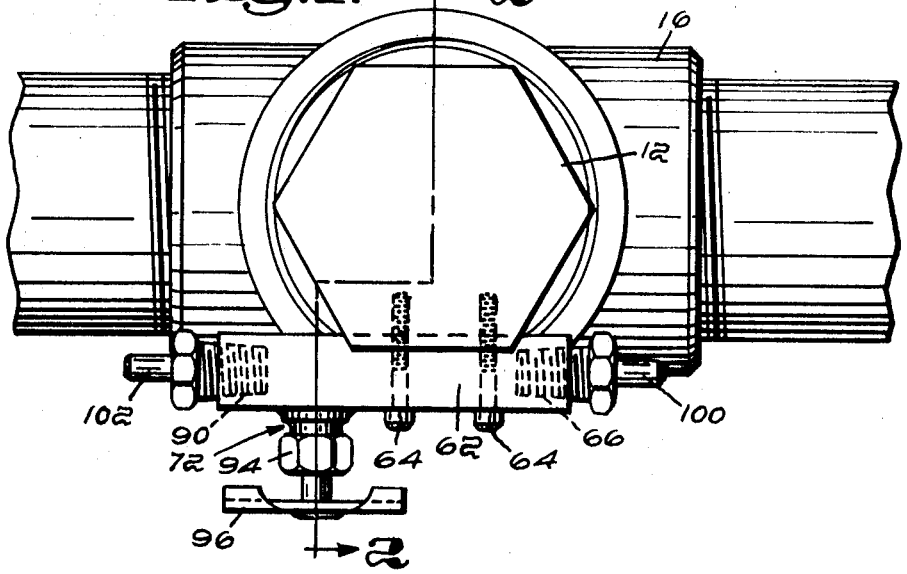

United States Patent

[11] 3,586,026

| [72] | Inventor | Harold J. Olson |
| | | 634 Broadway, Raynham, Mass. 02767 |
| [21] | Appl. No. | 821,671 |
| [22] | Filed | May 5, 1969 |
| [45] | Patented | June 22, 1971 |

[54] APPARATUS RESPONSIVE TO FLOW OF FLUID WITH VALVE
6 Claims, 4 Drawing Figs.

| [52] | U.S. Cl. | 137/87 |
| [51] | Int. Cl. | F16k 31/12 |
| [50] | Field of Search | 137/87, 98; 251/218 |

[56] References Cited
UNITED STATES PATENTS

| 2,388,085 | 10/1945 | Russell | 137/483 X |
| 3,147,950 | 9/1964 | Milleville | 251/218 X |
| 3,395,721 | 8/1968 | Shibata | 137/87 |
| 3,396,740 | 8/1968 | Olson | 137/87 |

*Primary Examiner*—Alan Cohan
*Attorney*—Harold E. Cole

ABSTRACT: Apparatus that is operable by flow of fluid to control the speed of a motor during a pumping operation. A flap actuated by said fluid flow is operably connected to rotate a shaft, which opens a vacuum passage in a casing that communicates with the vacuum in an automobile motor to actuate a throttle whereby motor speed is controlled automatically. A valve mounted in said casing controls the degree of vacuum in said passage.

PATENTED JUN22 1971 3,586,026

SHEET 1 OF 2

Inventor:
Harold J. Olson
by Harold E. Cole
Attorney

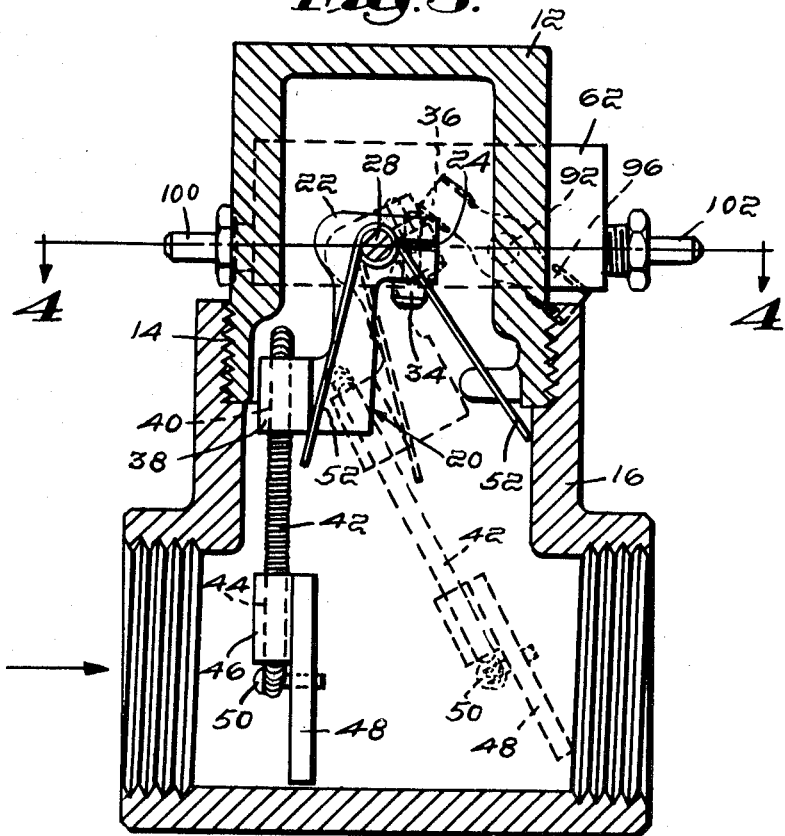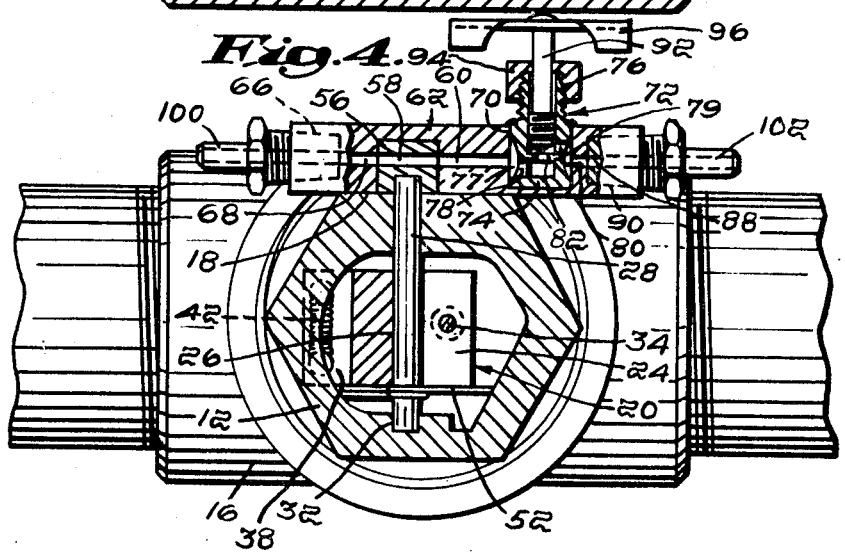

APPARATUS RESPONSIVE TO FLOW OF FLUID WITH VALVE

The principal object of my invention is to provide a valve casing attachable to apparatus actuated by fluid flow and which casing has a vacuum passage the size of which is determined by a valve operably mounted in said casing.

Reference is made to my U.S. Pat. No. 3,396,740 dated Aug. 13, 1968 for Valve Apparatus Responsive To Fluid Flow, and No. 3,217,652 dated Nov. 16, 1965 for "Fluid-actuated Electrical Apparatus To Control Motor Speed."

The foregoing and other objects which will appear as the nature of the invention is better understood, may be accomplished by a construction, combination and operative arrangement of parts such as is disclosed by the drawings. The nature of the invention is such as to render its susceptible to various changes and modifications, and therefore, I am not to be limited to the construction disclosed by the drawings nor to the particular parts described in the specification; but am entitled to all such changes therefrom as fall within the scope of my invention.

Figure 2:
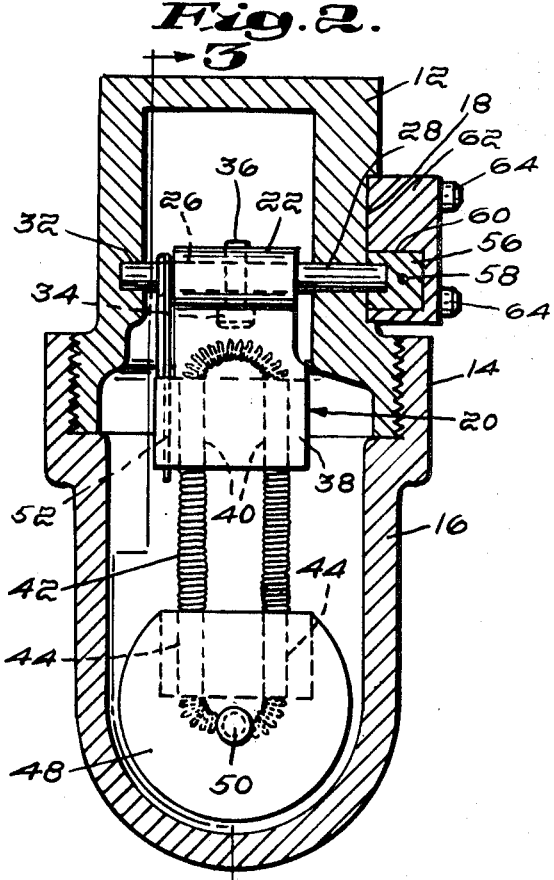

In the drawings:

FIG. 1 is a top plan view of my apparatus, in open position.
FIG. 2 is a sectional view taken on the line 2–2 of FIG. 1.
FIG. 3 is a sectional view taken on the line 3–3 of FIG. 2.
FIG. 4 is a sectional view taken on the line 4–4 of FIG. 3.

As illustrated, my valve apparatus, which is operable by flow of fluid, has a main housing or support having an upper portion 12 that is screw-threaded as at 14 to connect with a lower portion or T-shaped fitting 16 that has a rectangular recess 18 in a side thereof. Oil or other fluid flows through the latter from a source of supply such as a tank carried by an automobile truck to which a pump is connected.

Extending into said housing portion 12 is fluid-flow actuating mechanism having a movable connector or mounting member 20 that responds to fluid flow and which has an upper portion 22 having a laterally extending slit 24 therein and a bore 26 extending through said connector 20 that communicates with said slit.

A rotatable shaft 28 extends through said bore 26 being fixed to said connector 20 and rotating therewith. Said shaft movably extends into a recess 32 formed in said upper portion 12. A tightening screw 34 extends into a portion divided by said slit 24 and screw-threadedly connects with screw threads 36 in a portion at the opposite side of said slit to thereby hold said shaft 28 fixed to said connector 20.

A lower and offset portion 38 of said connector 20 has two holes 40 extending therethrough. A coil spring 42 extends through said holes forming a loop beyond said connector lower portion 38. The two ends of said spring loop 42 pass through holes 44 made in a boss 46 of a flap or leaf 48 and said ends are fastened to a pin 50 projecting from said flap 48. A tension spring 52 bears at one end on said housing portion 12, passing around said shaft 28 and bearing at its other end on said boss 46. This spring 52 normally keeps said flap 48 in predetermined position as indicated by the full lines in said FIG. 3.

Said shaft 28 has a valve actuating end portion 56 of enlarged diameter outside of said housing portion 10 that has a vacuum passage hole 58 extending laterally therethrough.

A casing or block 62 provides a vacuum passage therethrough as later explained. Its rear surface is flat and extends into said recess 18, projecting beyond the latter at opposite ends. This casing 62 has a circular bore 60 extending only partly thereinto that rotatably receives said shaft portion 56. Screws 64 hold said casing to said housing portion 10. At an outside end of said casing 62 is a screw-threaded opening 66 serving as a portion of a vacuum passage, later described, and which communicates with an inwardly extending orifice 68 forming a portion of said vacuum passage.

At the front of said casing 62 is an opening 70 to movably receive a main body 74 of a vacuum control valve 72. This body is hollow, being closed at one end and having a reduced end 76 that is exteriorly screw-threaded and also interiorly screw-threaded. At a side of said valve body 74 is a recess 77 that communicates with a small valve hole 78. At a side opposite thereto is a recess 79 similar to said recess 77 and that communicates with another small valve hole 80 that communicates indirectly with said hole 78 to complete a passage through said valve body 74. Said hole 78 is nearer the closed end of said body 74 than said hole 80, thus being farther inwardly when said valve is in position of use. This provides a seat 82 in said body 74.

At another end of said casing 62 opposite said opening 66 is a screw threaded hole 90 later referred to, from which an orifice 88 extends that serves as an extension of said orifice 68 and communicates with said opening 66. Thus what I term a vacuum passage may be established extending completely through said casing 62 when said valve 72 is in open position and shaft end portion 56 has been actuated to bring hole 58 into communication with the passages in said casing 62. Said hole portions 66 and 90 extend beyond said recess 18 at opposite sides of said valve casing 62.

Said valve 72 has a stem 92 with a handle 96, and it has exterior screw threads adjacent the inner end onto which a locking nut 94 is screw-threadedly connected. Said stem 92 is adapted to enter said body 74 to whatever extent is desired to reduce the size of the vacuum passage. When screwed to closed position therein on said seat 82 said stem 92 closes or blocks off said hole 80 so that communication with said hole 78 ceases and the vacuum passage is closed.

Couplings 100 and 102 screw-threadedly connect with said holes 66 and 90 respectively which in turn may be connected to an automobile manifold and throttle that controls motor speed.

In operation, when the motor of a truck is idling, for instance, and operably connected to a pump, a fluid such as oil may be pumped through said T-fitting 16. The flowing fluid moves said flap 48 to operative position, as shown in dash lines in said FIG. 3, and in turn said connector 20 and shaft 28 are rotatably moved which turns the shaft actuating portion 56 so that said hole 58 communicates with said orifices 68 and 88 thus clearing said vacuum passage through said valve casing 62. Upon establishing said passage a vacuum line is established from a vacuum manifold, not shown, thus communicating with the usual automobile motor through a said coupling 100.

Said other coupling 102 may be connected to a throttle or other mechanism to control motor speed such as disclosed in my U.S. Pat. No. 3,101,670 granted Aug. 27, 1963. The opening or partial opening of said vacuum passage while the motor is running will actuate the motor throttle and increase motor speed which will result in operating the oil pump at the most efficient pumping speed.

When the flow of fluid ceases, the flap 48, connector 20, shaft 28 and shaft actuating portion 56 return to normal position, which results in closing said vacuum passage.

The foregoing operation, however, depends upon the position of said valve stem 92 which may close the valve hole 80, thus rendering my apparatus inoperative. Ordinarily said valve stem 92 will be positioned to only partly close said valve hole 80 to whatever extent desired to give the operator the desired control over the vacuum passage. Likewise when the control valve 72 is open it has no effect on the vacuum passage.

What I claim is:

1. A valve apparatus for permitting flow in a first line in response to flow in a second line, and in combination with a motor manifold and a control throttle, said valve apparatus comprising a housing having an upper and a lower portion, said lower portion, forming a part of said second line, an actuating mechanism supported by said housing and having a movable connector portion extending into said lower portion, a flap attached to and extending below said connector and being responsive to flow in said lower portion, said housing upper portion having a laterally extending bore therethrough, a shaft rotatably mounted in said bore and fixed to and movable with said connector and having a hole extending laterally therethrough, a separate valve casing outside of and attached to said housing and having a bore aligned with said housing bore and into which said shaft rotatably extends, said casing having end openings located at opposite ends thereof in communication respectively with said manifold and throttle and having a passage therethrough communicating with and being of smaller diameter than said openings and with said shaft hole when the latter is in open position.

2. A valve apparatus as set forth in claim 1, said casing having another opening therein extending laterally, and a vacuum control valve having a body extending into said latter opening and having a passage extending laterally therethrough and communicating with said casing passage and embodying a valve stem movable in said body and adapted in closed position to close said body passage.

3. A valve apparatus as set forth in claim 2, said valve body passage having two holes extending laterally the first of which is nearer the inner end of said body in position of use than the other, said two holes communicating with each other.

4. A valve apparatus as set forth in claim 3, said valve body having a seat between said two holes, said stem being adapted to contact said seat when said valve is in closed position.

5. A valve apparatus as set forth in claim 2, said control valve having an exteriorly and interiorly threaded portion adjoining and outwardly of said body in position of use, a locknut on said exteriorly threaded portion and a handle outwardly of said locknut and attached to said stem, said stem having an exteriorly screw-threaded portion screw-threadedly connected with said interiorly threaded portion.

6. A valve apparatus as set forth in claim 1, said shaft having an enlarged end portion extending wholly into said bore and in which said lateral hole is located.